US012794570B2

(12) United States Patent
Li et al.

(10) Patent No.: US 12,794,570 B2
(45) Date of Patent: Nov. 10, 2026

(54) OSCILLATION FREQUENCY CONTROL METHOD AND SYSTEM, AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Ziqian Li, Beijing (CN); Jiaxiang Zhang, Beijing (CN); Yuan Fang, Beijing (CN); Hongjin Hu, Beijing (CN); Zheng Bao, Beijing (CN); Gong Chen, Beijing (CN); Xiaoliang Fu, Beijing (CN); Chuxiang Wang, Beijing (CN); Kang Wang, Beijing (CN); Yawen Chen, Beijing (CN); Bin Zhang, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 300 days.

(21) Appl. No.: 18/687,994

(22) PCT Filed: Sep. 20, 2022

(86) PCT No.: PCT/CN2022/119787

§ 371 (c)(1),
(2) Date: Feb. 29, 2024

(87) PCT Pub. No.: WO2024/059991

PCT Pub. Date: Mar. 28, 2024

(65) Prior Publication Data

US 2025/0125886 A1 Apr. 17, 2025

(51) Int. Cl.
*H04W 4/90* (2018.01)
*H04B 15/06* (2006.01)

(52) U.S. Cl.
CPC .................................... *H04B 15/06* (2013.01)

(58) Field of Classification Search
CPC . H04B 15/06; H04W 4/90; G06F 1/06; H03L 7/183

(Continued)

(56) References Cited

U.S. PATENT DOCUMENTS

2010/0141613 A1 6/2010 Sonobe
2010/0203848 A1 * 8/2010 Darabi .................... H03L 7/183 455/86

(Continued)

FOREIGN PATENT DOCUMENTS

CN 102768620 B 5/2015
CN 105871478 A 8/2016

(Continued)

OTHER PUBLICATIONS

Extended European Search Report issued on Jan. 29, 2025, for application No. EP22959003.9.

*Primary Examiner* — Abdul-Samad A Adediran
(74) *Attorney, Agent, or Firm* — Nath, Goldberg & Meyer; Joshua B. Goldberg

(57) ABSTRACT

An oscillation frequency control method and system and a display device are provided. The oscillation frequency control system (3) is for a display device including a communication component (2) and a display driver component (1). The display driver component (3) includes at least one oscillator. The oscillation frequency control system (3) includes: an acquisition component (31) configured to acquire current operating information of the communication component (2); a determination component (32) configured (Continued)

to determine an oscillation operating frequency corresponding to each oscillator according to the current operating information; and a control component (33) configured to control each oscillator to operate at a corresponding oscillation operating frequency, wherein a frequency of a harmonic wave generated when each oscillator operates at the corresponding oscillation operating frequency falls outside a communication operating frequency band in which the communication component (2) currently operates.

18 Claims, 9 Drawing Sheets

(58) Field of Classification Search
USPC .......................................................... 455/86
See application file for complete search history.

(56) References Cited

U.S. PATENT DOCUMENTS

| | | | | |
|---|---|---|---|---|
| 2012/0126872 | A1 | 5/2012 | Frank | |
| 2019/0050188 | A1 | 2/2019 | Park et al. | |
| 2020/0260250 | A1 * | 8/2020 | Oga | H04W 4/90 |
| 2024/0069675 | A1 * | 2/2024 | Lee | G06F 1/06 |

FOREIGN PATENT DOCUMENTS

| | | | |
|---|---|---|---|
| CN | 106059579 | A | 10/2016 |
| CN | 107147419 | A | 9/2017 |
| CN | 107453837 | A | 12/2017 |
| CN | 114584175 | A | 6/2022 |
| CN | 114650334 | A | 6/2022 |

* cited by examiner

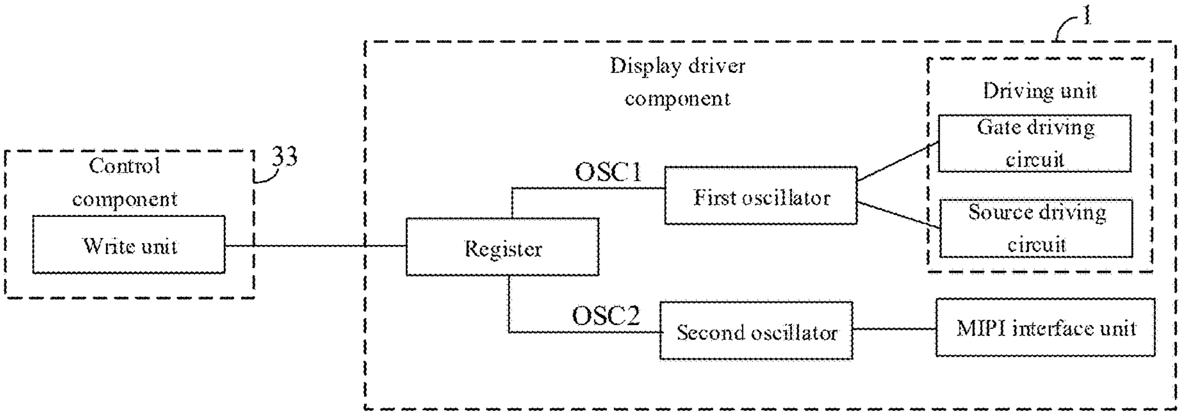

FIG. 6

➢ OSC1=151.7MHz & OSC2 = 165.4MHz

Code Setting: (MIPI = 1346Mbps)

| Command | R/W | Values | Description |
| --- | --- | --- | --- |
| 0xF0 | W | 0x55,0xAA,0x52,0x08,0x01 | OSC Calibration |
| 0xC3 | W | 0X99,0X04,0X20,0X15,0XFF,0XD0,0X04,0X20,0X0E,0XFF,0X00,0X06,<br>0X50,0X1C,0X06,0X25,0X19,0X06,0X50,0X1C,0X06,0X25,0X19,0X06,<br>0X50,0X1C,0X06,0X25,0X19,0X06,0X50,0X1C,0X06,0X25,0X19,0X06,<br>0X50,0X1C,0X06,0X25,0X19 | |
| | | | |

FIG. 7A

➢ OSC1=151.7MHz & OSC2 = 170.5MHz

Code Setting: (MIPI = 1346Mbps)

| Command | R/W | Values | Description |
| --- | --- | --- | --- |
| 0xF0 | W | 0x55,0xAA,0x52,0x08,0x01 | OSC Calibration |
| 0xC3 | W | 0X99,0X04,0X20,0X15,0XFF,0XD0,0X04,0X20,0X0E,0XFF,0X00,0X06,<br>0X50,0X1C,0X06,0X56,0X19,0X06,0X50,0X1C,0X06,0X56,0X19,0X06,<br>0X50,0X1C,0X06,0X56,0X19,0X06,0X50,0X1C,0X06,0X56,0X19,0X06,<br>0X50,0X1C,0X06,0X56,0X19 | |
| | | | |

FIG. 7B

➢ OSC1=148MHz & OSC2 = 165.4MHz

Code Setting: (MIPI = 1346Mbps)

| Command | R/W | Values | Description |
|---|---|---|---|
| 0xF0 | W | 0x55,0xAA,0x52,0x08,0x01 | OSC Calibration |
| 0xC3 | W | 0X99,0X04,0X20,0X15,0XFF,0X00,0X04,0X20,0X0E,0XFF,0X00,0X06,0X29,0X1C,0X06,0X25,0X19,0X06,0X29,0X1C,0X06,0X25,0X19,0X06,0X29,0X1C,0X06,0X25,0X19,0X06,0X29,0X1C,0X06,0X25,0X19,0X06,0X29,0X1C,0X06,0X25,0X19 | |
| | | | |

➢ OSC1=148MHz & OSC2 = 170.5MHz

Code Setting: (MIPI = 1346Mbps)

| Command | R/W | Values | Description |
|---|---|---|---|
| 0xF0 | W | 0x55,0xAA,0x52,0x08,0x01 | OSC Calibration |
| 0xC3 | W | 0X99,0X04,0X20,0X15,0XFF,0X00,0X04,0X20,0X0E,0XFF,0X00,0X06,0X29,0X1C,0X06,0X56,0X19,0X06,0X29,0X1C,0X06,0X56,0X19,0X06,0X29,0X1C,0X06,0X56,0X19,0X06,0X29,0X1C,0X06,0X56,0X19,0X06,0X29,0X1C,0X06,0X56,0X19 | |
| | | | |

OSCILLATION FREQUENCY CONTROL METHOD AND SYSTEM, AND DISPLAY DEVICE

CROSS-REFERENCE TO RELATED APPLICATIONS

This is a National Phase Application filed under 35 U.S.C. 371 as a national stage of PCT/CN2022/119787 filed on Sep. 20, 2022, the entire content of which is incorporated herein by reference.

TECHNICAL FIELD

The present disclosure relates to the field of display technology, and in particular, to an oscillation frequency control method, an oscillation frequency control system, and a display device.

BACKGROUND

Along with the intellectualization of display products, more and more display products have a communication function. Specifically, a communication component is provided in each display product to enable the display product to communicate with other terminals (e.g., a server, a computer, a smart television, a mobile phone, etc.).

SUMMARY

In a first aspect, embodiments of the present disclosure provide an oscillation frequency control system for a display device, wherein the display device includes a communication component and a display driver component, the display driver component includes at least one oscillator; and the oscillation frequency control system includes:

an acquisition component configured to acquire current operating information of the communication component;

a determination component configured to determine an oscillation operating frequency corresponding to each oscillator according to the current operating information; and a control component configured to control each oscillator to operate at a corresponding oscillation operating frequency, wherein a frequency of a harmonic wave generated when each oscillator operates at the corresponding oscillation operating frequency falls outside a communication operating frequency band in which the communication component currently operates.

In some embodiments, the current operating information includes the communication operating frequency band in which the communication component currently operates.

In some embodiments, the oscillation frequency control system further includes:

a frequency band detection component, which is configured to detect whether the communication operating frequency band of the communication component is changed, and control the acquisition component to acquire the communication operating frequency band in which the communication component currently operates in response to detecting that the communication operating frequency band of the communication component is changed.

In some embodiments, the oscillation frequency control system further includes:

a first storage component configured to store first correspondence relationship data, wherein the first correspondence relationship data records different communication operating frequency bands and frequency adjustment schemes corresponding to the different communication operating frequency bands, and the frequency adjustment schemes record an oscillation operating frequency corresponding to each oscillator; and the determination component is further configured to determine a frequency adjustment scheme corresponding to the communication operating frequency band in which the communication component currently operates according to the first correspondence relationship data.

In some embodiments, the oscillation frequency control system further includes:

a frequency band detection component, which is configured to detect whether the communication operating frequency band of the communication component is changed;

an interference detection component, which is configured to further detect, in response to the frequency band detection component detecting that the communication operating frequency band of the communication component is changed, whether the communication operating frequency band in which the communication component currently operates is interfered by a harmonic wave generated by any one of the at least one oscillator, establish a correspondence relationship between the communication operating frequency band in which the communication component currently operates and the oscillation operating frequency in which each oscillator currently operates and store the correspondence relationship into the first storage component in response to detecting that the communication operating frequency band in which the communication component currently operates is not interfered by a harmonic wave generated by any one of the at least one oscillator, and control the acquisition component to acquire the communication operating frequency band in which the communication component currently operates in response to detecting that the communication operating frequency band in which the communication component currently operates is interfered by a harmonic wave generated by any one of the at least one oscillator;

a first storage component configured to store first correspondence relationship data, wherein the first correspondence relationship data records different communication operating frequency bands and frequency adjustment schemes corresponding to the different communication operating frequency bands, and the frequency adjustment schemes record an oscillation operating frequency corresponding to each oscillator; and the determination component is further configured to determine a frequency adjustment scheme corresponding to the communication operating frequency band in which the communication component currently operates according to the first correspondence relationship data.

In some embodiments, the current operating information includes a communication standard according to which the communication component currently operates.

In some embodiments, the communication standard supported by the communication component includes at least one of a 2G communication standard, a 3G communication standard, a WIFI communication standard, a 4G communication standard, or a 5G communication standard.

In some embodiments, the oscillation frequency control system further includes:

a standard detection component, which is configured to detect whether the communication standard of the communication component is changed, and control the acquisition component to acquire the communication standard according to which the communication component currently operates in response to detecting that the communication standard of the communication component is changed.

In some embodiments, the oscillation frequency control system further includes:

a second storage component configured to store second correspondence relationship data, wherein the second correspondence relationship data records different communication standards and frequency adjustment schemes corresponding to the different communication standards, and the frequency adjustment schemes record an oscillation operating frequency corresponding to each oscillator; and the determination component is further configured to determine a frequency adjustment scheme corresponding to the communication standard according to which the communication component currently operates according to the second correspondence relationship data.

In some embodiments, the oscillation frequency control system further includes:

a standard detection component, which is configured to detect whether the communication standard of the communication component is changed;

an interference detection component, which is configured to further detect, in response to the standard detection component detecting that the communication standard of the communication component is changed, whether the communication operating frequency band in which the communication component currently operates is interfered by a harmonic wave generated by any one of the at least one oscillator, establish a correspondence relationship between the communication standard according to which the communication component currently operates and the oscillation operating frequency in which each oscillator currently operates and store the correspondence relationship into a second storage component in response to detecting that the communication operating frequency band in which the communication component currently operates is not interfered by a harmonic wave generated by any one of the at least one oscillator, and control the acquisition component to acquire the communication standard according to which the communication component currently operates in response to detecting that the communication operating frequency band in which the communication component currently operates is interfered by a harmonic wave generated by any one of the at least one oscillator;

the second storage component configured to store second correspondence relationship data, wherein the second correspondence relationship data records different communication standards and frequency adjustment schemes corresponding to the different communication standards, and the frequency adjustment schemes record an oscillation operating frequency corresponding to each oscillator; and the determination component is further configured to determine a frequency adjustment scheme corresponding to the communication standard according to which the communication component currently operates according to the second correspondence relationship data.

In some embodiments, the display driver component further includes a register, and each oscillator is configured to operate according to a corresponding control instruction recorded in the register;

the control component includes:

a write unit configured to write the corresponding control instruction into the register according to the oscillation operating frequency corresponding to each oscillator determined by the determination component, such that each oscillator operates at the corresponding oscillation operating frequency according to control instructions recorded in the register.

In some embodiments, the oscillation frequency control system further includes:

a frequency calibration component configured to perform frequency calibration on the at least one oscillator.

In some embodiments, the display driver component further includes a driving unit and an MIPI interface unit;

the at least one oscillator includes a first oscillator and a second oscillator; and the first oscillator is configured to provide a clock signal to the driving unit, and the second oscillator is configured to provide a clock signal to the MIPI interface unit.

In a second aspect, embodiments of the present disclosure further provide a display device, including a communication component, a display driver component, and the oscillation frequency control system according to any one of the embodiments of the first aspect.

In a third aspect, embodiments of the present disclosure further provide an oscillation frequency control method for a display device, wherein the display device includes a communication component and a display driver component, the display driver component includes at least one oscillator; and the oscillation frequency control method includes:

acquiring current operating information of the communication component;

determining an oscillation operating frequency corresponding to each oscillator according to the current operating information; and controlling each oscillator to operate at a corresponding oscillation operating frequency, wherein a frequency of a harmonic wave generated when each oscillator operates at the corresponding oscillation operating frequency falls outside a communication operating frequency band in which the communication component currently operates.

In some embodiments, the current operating information includes the communication operating frequency band in which the communication component currently operates.

In some embodiments, prior to the acquiring current operating information of the communication component, the oscillation frequency control method further includes:

detecting whether the communication operating frequency band of the communication component is changed; and performing control to acquire the communication operating frequency band in which the communication component currently operates in response to detecting that the communication operating frequency band of the communication component is changed.

In some embodiments, the determining an oscillation operating frequency corresponding to each oscillator according to the current operating information includes:

determining a frequency adjustment scheme corresponding to the communication operating frequency band in which the communication component currently operates according to first correspondence relationship data stored in advance;

wherein the first correspondence relationship data records different communication operating frequency bands and frequency adjustment schemes corresponding to the different communication operating frequency bands, and the frequency adjustment schemes record an oscillation operating frequency corresponding to each oscillator.

In some embodiments, prior to the acquiring current operating information of the communication component, the oscillation frequency control method further includes:

detecting whether the communication operating frequency band of the communication component is changed;

further detecting, in response to detecting that the communication operating frequency band of the communication component is changed, whether the communication operating frequency band in which the communication component currently operates is interfered by a harmonic wave generated by any one of the at least one oscillator;

establishing a correspondence relationship between the communication operating frequency band in which the communication component currently operates and the oscillation operating frequency in which each oscillator currently operates and store the correspondence relationship into first correspondence relationship data in response to detecting that the communication operating frequency band in which the communication component currently operates is not interfered by a harmonic wave generated by any one of the at least one oscillator; and acquiring the communication operating frequency band in which the communication component currently operates in response to detecting that the communication operating frequency band in which the communication component currently operates is interfered by a harmonic wave generated by any one of the at least one oscillator;

the determining an oscillation operating frequency corresponding to each oscillator according to the current operating information includes:

determining a frequency adjustment scheme corresponding to the communication operating frequency band in which the communication component currently operates according to the first correspondence relationship data stored in advance, wherein the first correspondence relationship data records different communication operating frequency bands and frequency adjustment schemes corresponding to the different communication operating frequency bands, and the frequency adjustment schemes record an oscillation operating frequency corresponding to each oscillator.

In some embodiments, the current operating information includes a communication standard according to which the communication component currently operates.

In some embodiments, the communication standard supported by the communication component includes at least one of a 2G communication standard, a 3G communication standard, a WIFI communication standard, a 4G communication standard, or a 5G communication standard.

In some embodiments, prior to the acquiring current operating information of the communication component, the oscillation frequency control method further includes:

detect whether the communication standard of the communication component is changed; and acquiring the communication standard according to which the communication component currently operates in response to detecting that the communication standard of the communication component is changed.

In some embodiments, the determining an oscillation operating frequency corresponding to each oscillator according to the current operating information includes:

determining a frequency adjustment scheme corresponding to the communication standard according to which the communication component currently operates according to second correspondence relationship data stored in advance, wherein the second correspondence relationship data records different communication standards and frequency adjustment schemes corresponding to the different communication standards, and the frequency adjustment schemes record an oscillation operating frequency corresponding to each oscillator.

In some embodiments, prior to the acquiring current operating information of the communication component, the oscillation frequency control method further includes:

detecting whether the communication standard of the communication component is changed;

further detecting, in response to detecting that the communication standard of the communication component is changed, whether the communication operating frequency band in which the communication component currently operates is interfered by a harmonic wave generated by any one of the at least one oscillator;

establishing a correspondence relationship between the communication standard according to which the communication component currently operates and the oscillation operating frequency in which each oscillator currently operates and store the correspondence relationship into second correspondence relationship data in response to detecting that the communication operating frequency band in which the communication component currently operates is not interfered by a harmonic wave generated by any one of the at least one oscillator; and acquiring the communication standard according to which the communication component currently operates in response to detecting that the communication operating frequency band in which the communication component currently operates is interfered by a harmonic wave generated by any one of the at least one oscillator;

the determining an oscillation operating frequency corresponding to each oscillator according to the current operating information includes:

determining a frequency adjustment scheme corresponding to the communication standard according to which the communication component currently operates according to the second correspondence relationship data stored in advance, wherein the second correspondence relationship data records different communication standards and frequency adjustment schemes corresponding to the different communication standards, and the frequency adjustment schemes record an oscillation operating frequency corresponding to each oscillator.

In some embodiments, the display driver component further includes a register, and each oscillator is configured to operate according to a corresponding control instruction recorded in the register;

the controlling each oscillator to operate at a corresponding oscillation operating frequency includes:

writing the corresponding control instruction into the register according to the determined oscillation operating frequency corresponding to each oscillator, such that each oscillator operates at the corresponding oscillation operating frequency according to control instructions recorded in the register.

In some embodiments, the oscillation frequency control method further includes:

performing frequency calibration on the at least one oscillator.

In some embodiments, the display driver component further includes a driving unit and an MIPI interface unit;

the at least one oscillator includes a first oscillator and a second oscillator; and the first oscillator is configured to provide a clock signal to the driving unit, and the second oscillator is configured to provide a clock signal to the MIPI interface unit.

BRIEF DESCRIPTION OF THE DRAWINGS

FIG. 6 is a block diagram illustrating a structure of a display driver component according to an embodiment of the present disclosure;

FIG. 7A is a schematic diagram illustrating codes of control instructions written by a write unit to a register for controlling a first oscillator to operate at 151.7 Mhz and a second oscillator to operate at 165.4 MHz;

FIG. 7B is a schematic diagram illustrating codes of control instructions written by a write unit to a register for controlling a first oscillator to operate at 151.7 Mhz and a second oscillator to operate at 170.5 MHz;

DETAILED DESCRIPTION OF EMBODIMENTS

Figure 1:
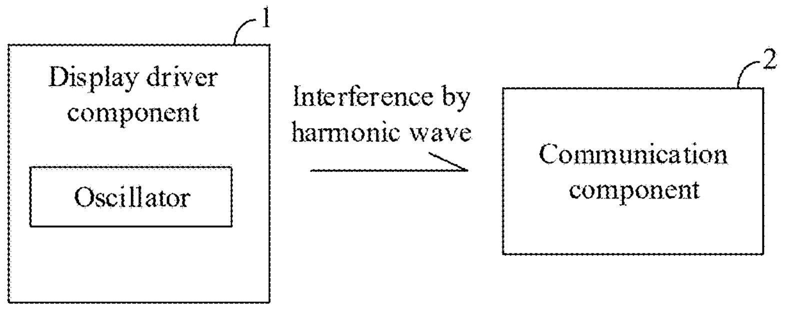
FIG. 1 is a schematic diagram illustrating that an oscillator in a display driver component causes interference to (or interferes with) a communication component according to an embodiment of the present disclosure.

To help one of ordinary skill in the art better understand technical solutions of the present disclosure, an oscillation frequency control method, an oscillation frequency control system, and a display device provided by the present disclosure will be described in detail below with reference to the accompanying drawings.

The figures described herein are only some examples or embodiments of the present disclosure, and it is obvious to one of ordinary skill in the art that the present disclosure may be applied to other similar situations without inventive efforts, according to the described figures. Moreover, it should be appreciated that such a development effort might be complex and tedious, but would nevertheless be a routine undertaking of design, fabrication, and manufacture for one of ordinary skill in the art based on the technical contents of the present disclosure, and the contents of the present disclosure should not be construed as being insufficient.

Reference in this specification to an "embodiment" means that a particular feature, structure, or characteristic described in connection with the embodiment may be included in at least one embodiment of the present disclosure. The appearances of the phrase in various places in this specification are not necessarily all referring to a same embodiment, nor are separate or alternative embodiments mutually exclusive of other embodiments. It is to be expressly and implicitly understood by one of ordinary skill in the art that an embodiment described herein may be combined with other embodiments in case of no conflict.

Unless otherwise defined, technical or scientific terms adopted herein should have the same meaning as commonly understood by one of ordinary skill in the art to which the present disclosure belongs. The use of the term "a", "an", "the", or the like in the present disclosure does not indicate limitation of quantity, but indicates either the singular or the plural. The use of the term "include", "comprise", "have", or any variations thereof herein, is meant to cover a non-exclusive inclusion; for example, a process, method, system, article, or apparatus that includes a list of steps or components (or units) is not limited to only including those steps or elements but may include other steps or units not expressly listed or inherent to such process, method, article, or apparatus. The term "connected", "coupled", or the like in this application is not intended to be limited to physical or mechanical connections, but rather may include electrical connections, whether direct or indirect. The phrase "a plurality of" as used herein means two or more. The phrase "and/or" describes the association relationship of the associated objects, indicating that there may be three relationships; for example, "A and/or B" may indicate the following three cases: A exists alone, both A and B exist, and B exists alone. The character "/" generally indicates that the associated object preceding the character "/" and the associated object following the character "/" are in an "or" relationship.

A display device with a communication function generally includes a communication component and a display driver component. The communication component realizes communication between the display device and the outside. The display driver component (which is also referred to as a "display driver chip", or a display driver IC (DDIC)) provides a driving signal for a display screen (or display panel) to drive the display screen (or display panel), and includes therein at least one oscillator that generates a system clock required by the display driver component.

Figure 2A:
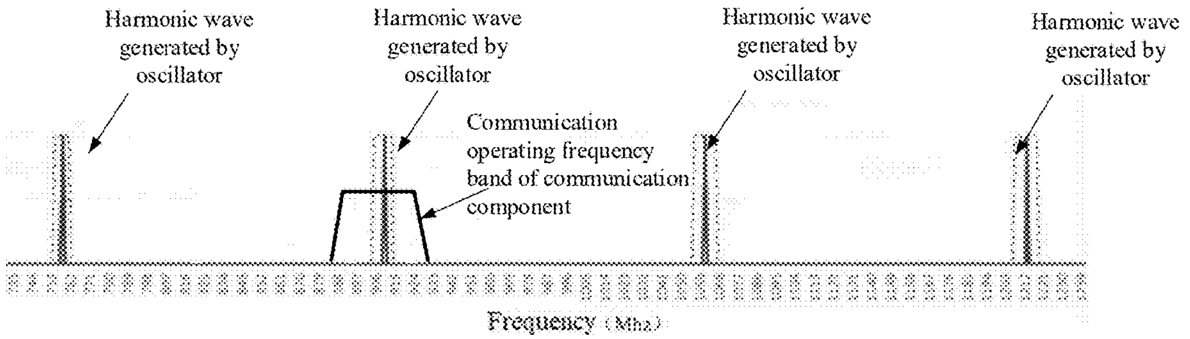
FIG. 2A is a schematic diagram illustrating that a harmonic wave generated by an oscillator falls within a communication operating frequency band of a communication component.
Figure 2B:
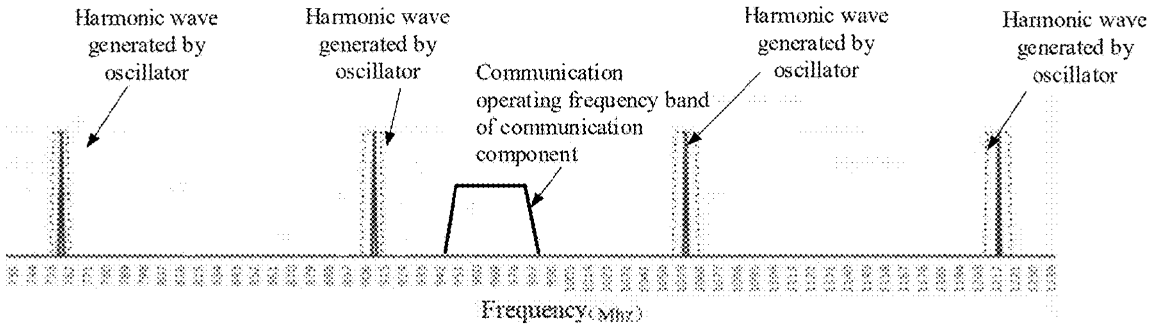
FIG. 2B is a schematic diagram illustrating that a harmonic wave generated by an oscillator falls outside a communication operating frequency band of a communication component.

FIG. 1 is a schematic diagram illustrating that an oscillator in a display driver component causes interference to (or interferes with) a communication component according to an embodiment of the present disclosure. FIG. 2A is a schematic diagram illustrating that a harmonic wave generated by an oscillator falls within a communication operating frequency band of a communication component, and FIG. 2B is a schematic diagram illustrating that a harmonic wave generated by an oscillator falls outside a communication operating frequency band of a communication component. As shown in FIGS. 1 to 2B, it is found in practical applications that a problem of poor communication quality of a communication component 2 may occur after some of display devices are entirely assembled. It has been found through researches that one of the main reasons for the poor communication quality of the communication component 2 in some of the display devices is that: an oscillation operating (or working) frequency of an oscillator in a display driver component 1 is set at the stage of entirely assembling and kept constant, some harmonic waves are generated by the oscillator when the oscillator operates at the set oscillation operating frequency during operation of the display device, and interference may occur due to resonance if the harmonic waves fall into a communication operating frequency band in which the communication component 2 currently operates, such that adverse effects may be generated on the signal sending and receiving capabilities of the communication component 2.

Since the oscillation operating frequency of the oscillator in the related art is fixed, in order to ensure the communication quality of the communication component 2, the related art often selects to make the communication operating frequency band of the communication component 2 avoid a frequency of each harmonic wave generated by the oscillator (i.e., each harmonic wave generated by the oscillator is always located outside the communication operating frequency band of the communication component 2), i.e., the communication component 2 is limited to operate at some specific frequency bands; however, in this way of limiting the communication operating frequency band of the communication component 2, the communication component 2 cannot operate in some communication standards, which greatly limits the performance of the communication component 2.

To effectively solve at least one of technical problems existing in the related art, the present disclosure provides corresponding solutions.

Figure 3:
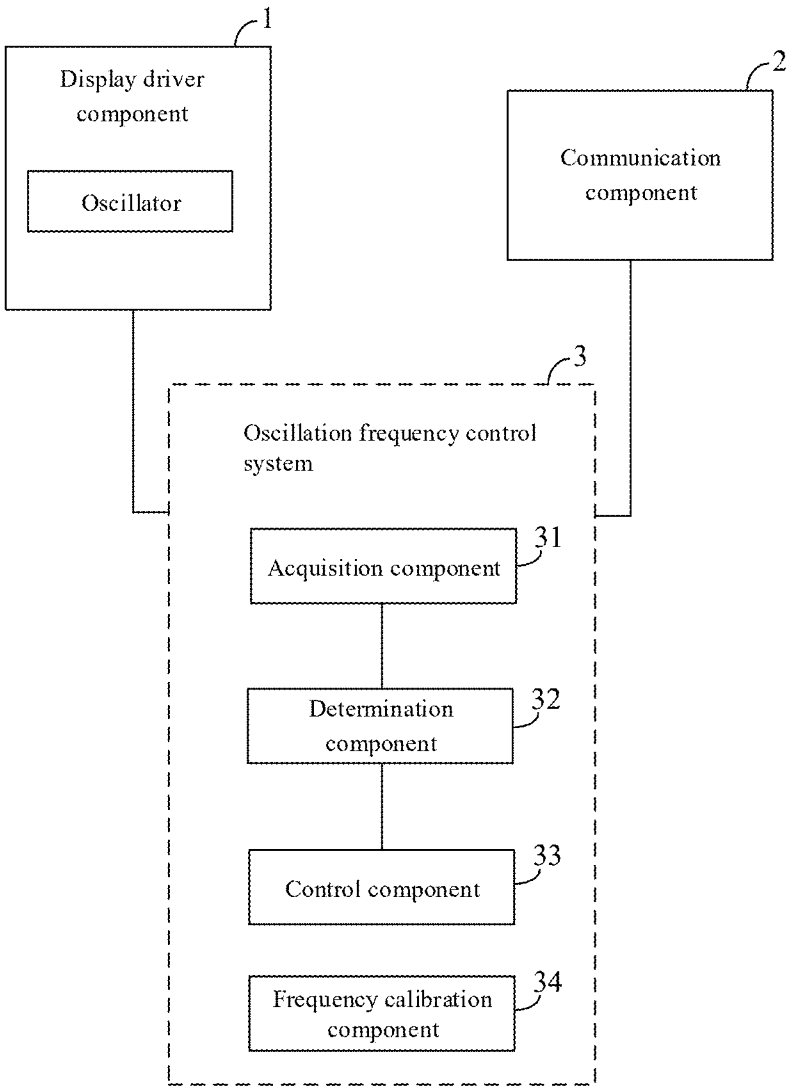
FIG. 3 is a block diagram illustrating a structure of an oscillation frequency control system according to an embodiment of the present disclosure.

FIG. 3 is a block diagram illustrating a structure of an oscillation frequency control system according to an embodiment of the present disclosure. As shown in FIG. 3, the oscillation frequency control system 3 is applicable to a display device including the communication component 2 and the display driver component 1 that includes at least one oscillator, where the communication component may be embedded in the display driver component or fixed near the display driver component. The display driver component 1 may be disposed on a flexible printed circuit (FPC) of the display device.

The oscillation frequency control system 3 includes an acquisition component 31, a determination component 32, and a control component 33. The acquisition component 31 is configured to acquire the current operating information of the communication component 2. The determination component 32 is configured to determine an oscillation operating frequency corresponding to each oscillator according to the current operating information. The control component 33 is configured to control each oscillator to operate at a corresponding oscillation operating frequency, where a frequency of a harmonic wave generated by each oscillator when the oscillator operates at the corresponding oscillation operating frequency falls outside a communication operating frequency band in which the communication component 2 currently operates.

In an embodiment of the present disclosure, the oscillation operating frequency of the oscillator in the display driver component 1 may be adjusted according to the current operating information of the communication component 2, such that the frequency of the harmonic wave generated when the oscillator operates is changed and falls outside the communication operating frequency band in which the communication component 2 currently operates, thereby effectively avoiding the problem that the harmonic wave generated by the oscillator interferes with the communication component 2.

In addition, by the above manner of adjusting the oscillation operating frequency of the oscillator, the communication operating frequency band of the communication component 2 is no longer limited, and the communication component 2 can be applied to various communication scenarios.

In some embodiments, the oscillation frequency control system 3 may be integrated in the display driver component 1 in a form of software, i.e., the oscillation frequency control system provided by the present disclosure may be implemented in a form of writing codes into the display driver component 1, and this scheme does not need a change in a hardware structure, which is beneficial to reducing development cost.

Alternatively, it should be understood by one of ordinary skill in the art that the oscillation frequency control system 3 provided by the present disclosure may also exist independently of the display driver component 1.

Figure 4A:
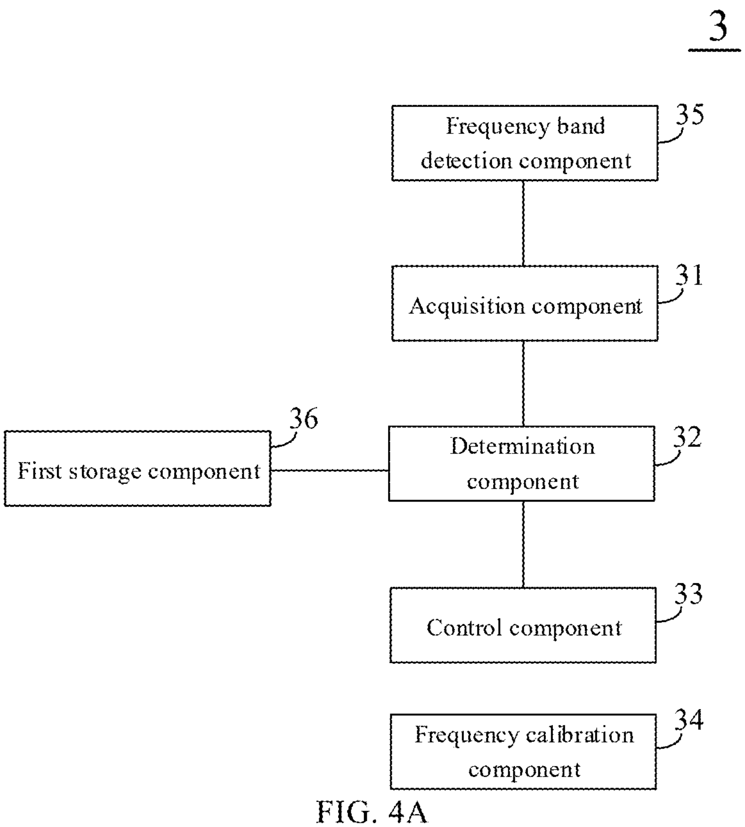
FIG. 4A is another block diagram illustrating a structure of an oscillation frequency control system according to an embodiment of the present disclosure.

FIG. 4A is another block diagram illustrating a structure of an oscillation frequency control system according to an embodiment of the present disclosure. As shown in FIG. 4A, in some embodiments, the current operating information of the communication component 2 acquired by the acquisition component 31 includes the communication operating frequency band in which the communication component 2 currently operates. In this case, the determination component 32 may determine the oscillation operating frequency corresponding to each oscillator according to the communication operating frequency band in which the communication component 2 currently operates.

In some embodiments, the oscillation frequency control system 3 further includes a first storage component 36, and the first storage component 36 may store first correspondence relationship data.

Table 1 is a table showing a correspondence relationship between different communication operating frequency bands and their corresponding frequency adjustment schemes in the embodiment of the present disclosure.

| Communication operating frequency band | Frequency adjustment scheme |
|---|---|
| Frequency band 1 | Adjustment scheme 1 |
| Frequency band 2 | Adjustment scheme 2 |
| Frequency band 3 | Adjustment scheme 3 |
| . . . | . . . |
| Frequency band m | Adjustment scheme m |

The first correspondence relationship data may be presented by the correspondence relationship table shown in Table 1 above. The first correspondence relationship data records different communication operating frequency bands and their corresponding frequency adjustment schemes, and the frequency adjustment schemes record the oscillation operating frequencies corresponding to the oscillators. The determination component 32 is further configured to determine, according to the first correspondence relationship data, a frequency adjustment scheme corresponding to a communication operating frequency band in which the communication component 2 currently operates.

It should be noted that, the different communication operating frequency bands may be divided according to the actual situation of the communication component 2, and then the frequency adjustment schemes corresponding to the different communication operating frequency bands are obtained through experiments/simulations performed in advance, as long as a frequency of a harmonic wave generated when each oscillator operates according to a determined frequency adjustment scheme falls outside the communication operating frequency band corresponding to the determined frequency adjustment scheme.

In some embodiments, the at least one oscillator disposed in the display driver component 1 includes a first oscillator and a second oscillator. An oscillation operating frequency of the first oscillator is denoted as OSC1, and an oscillation operating frequency of the second oscillator is denoted as OSC2. As an example, when the communication operating frequency band is in a first frequency band (i.e., frequency band 1), the first correspondence relationship data is invoked to record the frequency adjustment scheme 1, where the OSC1 of the first oscillator is 151 MHZ, and the OSC2 of the second oscillator is 165.4 MHZ; when the communication operating frequency band is in a second frequency band (i.e., frequency band 2), the first correspondence relationship data is invoked to record the frequency adjustment scheme 2, where the OSC1 of the first oscillator is 151 MHZ, and the OSC2 of the second oscillator is 170.5 MHZ; when the communication operating frequency band is in a third frequency band (i.e., frequency band 3), the first correspondence relationship data is invoked to record the frequency adjustment scheme 3, where the OSC1 of the first oscillator is 148 MHZ, and the OSC2 of the second oscillator is 165.4 MHZ; when the communication operating frequency band is in a fourth frequency band (i.e., frequency band 4), the first correspondence relationship data is invoked to record the frequency adjustment scheme 4, where the OSC1 of the first oscillator is 148 MHZ, and the OSC2 of the second oscillator is 170.5 MHZ.

In some embodiments, when the communication operating frequency band is in a first frequency band of about 943 MHZ, the first correspondence relationship data is invoked to record the frequency adjustment scheme 1, where the OSC1 of the first oscillator is 151 MHZ, and the OSC2 of the second oscillator is 165.4 MHZ; when the communication operating frequency band is in a second frequency band of about 1,800 MHZ, the first correspondence relationship data is invoked to record the frequency adjustment scheme 2, where the OSC1 of the first oscillator is 148 MHZ, and the OSC2 of the second oscillator is 170.5 MHZ.

In some embodiments, the communication component 2 may switch between a plurality of different communication operating frequency bands according to practical requirements (e.g., the communication component 2 supports 4G communication and 5G communication, and the communication operating frequency band of the communication component 2 may switch between the 4G frequency band and the 5G frequency band). In this case, the oscillation frequency control system 3 further includes a frequency band detection component 35, which is configured to detect whether the communication operating frequency band of the communication component 2 is changed; if it is detected that the communication operating frequency band of the communication component 2 is changed, the frequency band detection component 35 is configured to control the control acquisition component 31 to acquire a communication operating frequency band in which the communication component 2 currently operates, and then the determination component 32 and the control component 33 make the oscillation operating frequency of each oscillator in the display driver component 1 switch correspondingly, so as to ensure that a frequency of a harmonic wave generated during the operation of each oscillator always falls outside the communication operating frequency band in which the communication component 2 currently operates.

It can be seen from the foregoing description that, by providing the frequency band detection component 35, the oscillation operating frequency of each oscillator can be dynamically adjusted, so as to ensure that the communication component 2 can always have a better communication quality in different scenes.

Figure 4B:
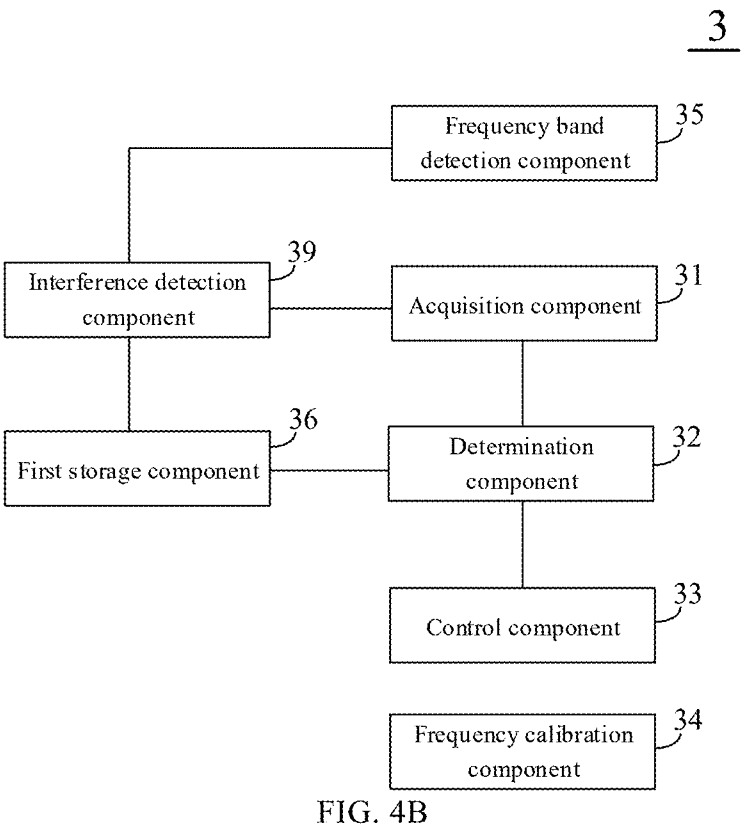
FIG. 4B is another block diagram illustrating a structure of an oscillation frequency control system according to an embodiment of the present disclosure.

FIG. 4B is another block diagram illustrating a structure of an oscillation frequency control system according to an embodiment of the present disclosure. As shown in FIG. 4B, in some embodiments, the oscillation frequency control system includes not only the frequency band detection component 35 and the first storage component 36, but also an interference detection component 39.

The frequency band detection component 35 is configured to detect whether the communication operating frequency band of the communication component 2 is changed. The interference detection component 39 is configured to, in response to that the frequency band detection component 35 detects a change in the communication operating frequency band of the communication component 2, further detect whether the communication operating frequency band in which the communication component 2 currently operates (i.e., the changed communication operating frequency band of the communication component 2) is interfered by a harmonic wave generated by an oscillator, establish a correspondence relationship between the communication operating frequency band in which the communication component 2 currently operates and the oscillation operating frequency at which each oscillator currently operates and store the correspondence relationship into the first storage component if it is detected that the communication operating frequency band in which the communication component 2 currently operates is not interfered by a harmonic wave generated by an oscillator, and control the acquisition component 31 to acquire the communication operating frequency band in which the communication component 2 currently operates if it is detected that the communication operating frequency band in which the communication component 2 currently operates is interfered by a harmonic wave generated by an oscillator. With such a design, the data stored in the first storage component 36 can be enriched continuously, so as to improve the control accuracy.

Figure 5A:
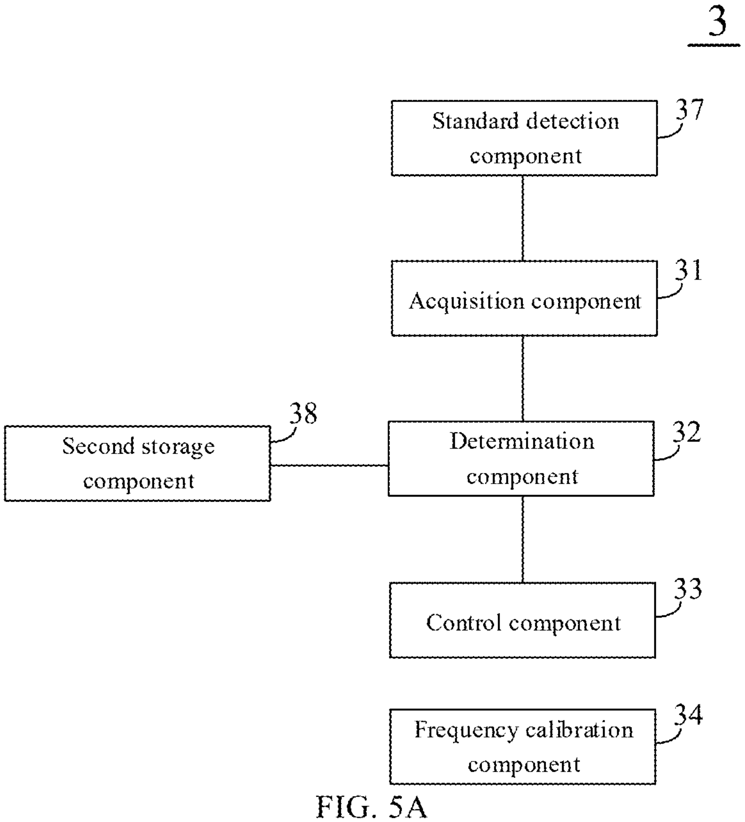
FIG. 5A is another block diagram illustrating a structure of an oscillation frequency control system according to an embodiment of the present disclosure.

FIG. 5A is another block diagram illustrating a structure of an oscillation frequency control system according to an embodiment of the present disclosure. As shown in FIG. 5A, in some embodiments, the current operating information of the communication component 2 acquired by the acquisition component 31 includes a communication standard according to which the communication component 2 currently operates. In this case, the determination component 32 may determine an oscillation operating frequency corresponding to each oscillator according to the communication standard according to which the communication component 2 currently operates.

Generally, communication standards according to which the communication component 2 operates are in one-to-one correspondence with the communication operating frequency bands of the communication component 2. After the communication standard according to which the communication component 2 currently operates is determined, the communication operating frequency band in which the communication component 2 currently operates is further determined, such that the oscillation operating frequency corresponding to each oscillator can be determined based on the communication standard according to which the communication component 2 currently operates. Here, the communication standards according to which the communication component 2 operates include, but are not limited to, the 2G communication standard (e.g., the GSM standard, the CDMA standard), the 3G communication standard (e.g., the TD-SCDMA standard, the WCDMA standard, the CDMA2000 standard), the WIFI communication standard, the 4G communication standard (e.g., the TD-LTE standard, the TD-LTE and FDD-LTE mixed standard), and the 5G communication standard.

In some embodiments, the oscillation frequency control system 3 further includes a second storage component 38 configured to store second correspondence relationship data.

Table 2 is a correspondence relationship table showing different communication standards and their corresponding frequency adjustment schemes according to an embodiment of the present disclosure.

| Communication standard | Frequency adjustment scheme |
|---|---|
| Standard 1 | Adjustment scheme 1' |
| Standard 2 | Adjustment scheme 2' |
| Standard 3 | Adjustment scheme 3' |
| . . . | . . . |
| Standard m | Adjustment scheme m' |

The second correspondence relationship data may be presented by the correspondence relationship table shown in Table 2 above. The second correspondence relationship data records different communication standards and their corresponding frequency adjustment schemes, and the frequency adjustment schemes record the oscillation operating frequencies corresponding to the oscillators. The determination component 32 is further configured to determine, according to the second correspondence relationship data, a frequency adjustment scheme corresponding to the communication standard according to which the communication component 2 currently operates.

It should be noted that, the communication standards to be recorded in the second correspondence relationship data may be designed according to the communication standards actually supported by the communication component 2, and then the frequency adjustment schemes corresponding to different communication standards are acquired by performing experiments/simulations in advance, as long as a frequency of a harmonic wave generated when each oscillator operates by adopting a determined frequency adjustment scheme falls outside the communication operating frequency band of the communication standard corresponding to the determined frequency adjustment scheme.

In some embodiments, the communication component 2 may switch between a plurality of different communication standards according to practical requirements (e.g., the communication component 2 supports 4G communication and 5G communication and can switch between the 4G communication standard and the 5G communication standard, and the communication operating frequency band of the communication component 2 can be switched accordingly). In this case, the oscillation frequency control system 3 further includes a standard detection component 37, which is configured to detect whether the communication standard of the communication component 2 (i.e., the communication standard according to which the communication component 2 operates) is changed; if it is detected that the communication standard of the communication component 2 is changed, the standard detection component 37 controls the acquisition component 31 to acquire the communication standard according to which the communication component 2 currently operates, and the determination component 32 and the control component 33 cause the oscillation operating frequency of each oscillator in the display driver component 1 to be switched correspondingly, so as to ensure that a frequency of a harmonic wave generated during the operation of each oscillator always falls outside the communication operating frequency band in which the communication component 2 currently operates.

In some embodiments, the communication standards configured for the communication component 2 include at least one of the 2G communication standard, the 3G communication standard, the WIFI communication standard, the 4G communication standard, or the 5G communication standard.

In some embodiments, the at least one oscillator disposed in the display driver component 1 includes a first oscillator and a second oscillator. The oscillation operating frequency of the first oscillator is denoted as OSC1, and the oscillation operating frequency of the second oscillator is denoted as OSC2. As an example, when the communication standard is a first communication standard (i.e., standard 1), the second correspondence relationship data is invoked to record the frequency adjustment scheme 1', where the OSC1 of the first oscillator is 151 MHZ, and the OSC2 of the second oscillator is 165.4 MHZ; when the communication standard is a second communication standard (i.e., standard 2), the second correspondence relationship data is invoked to record the frequency adjustment scheme 2', where the OSC1 of the first oscillator is 151 MHZ, and the OSC2 of the second oscillator is 170.5 MHZ; when the communication standard is a third communication standard (i.e., standard 3), the second correspondence relationship data is invoked to record the frequency adjustment scheme 3', where the OSC1 of the first oscillator is 148 MHZ, and the OSC2 of the second oscillator is 165.4 MHZ; when the communication standard is a fourth communication standard (i.e., standard 4), the second correspondence relationship data is invoked to record the frequency adjustment scheme 4', where the OSC1 of the first oscillator is 148 MHZ, and the OSC2 of the second oscillator is 170.5 MHZ.

In some embodiments, when the communication standard is the first communication standard (e.g., standard 1=4G), the second correspondence relationship data is invoked to record the frequency adjustment scheme 1', where the OSC1 of the first oscillator is 151 MHZ, and the OSC2 of the second oscillator is 165.4 MHZ; when the communication standard is the second communication standard (e.g., system 2=5G), the second correspondence relationship data is invoked to record the frequency adjustment scheme 2', where the OSC1 of the first oscillator is 148 MHZ, and the OSC2 of the second oscillator is 170.5 MHZ.

Figure 5B:
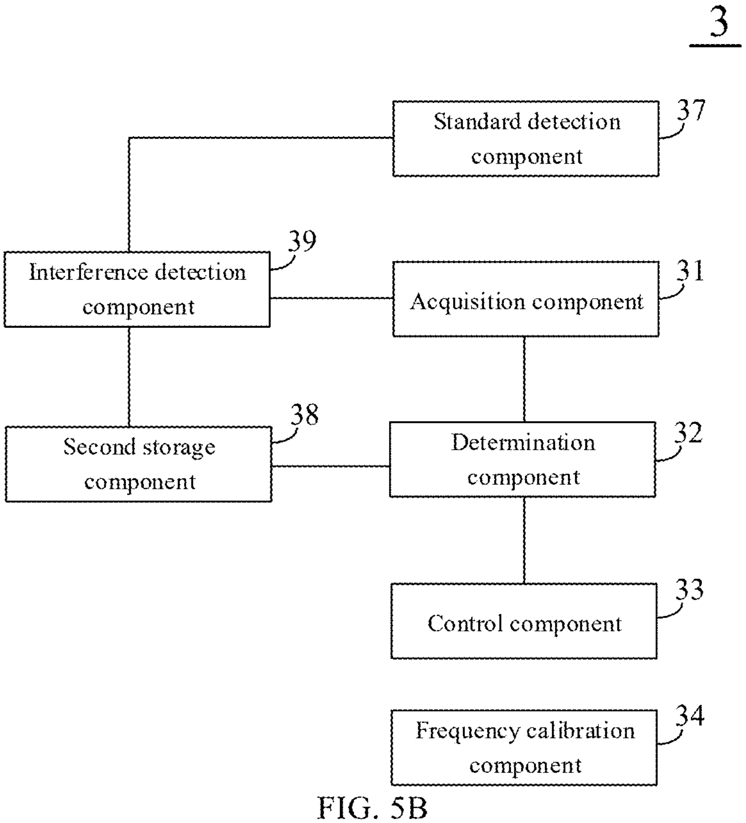
FIG. 5B is another block diagram illustrating a structure of an oscillation frequency control system according to an embodiment of the present disclosure.

FIG. 5B is another block diagram illustrating a structure of an oscillation frequency control system according to an embodiment of the present disclosure. As shown in FIG. 5B, in some embodiments, the oscillation frequency control system includes not only the standard detection component 37 and the second storage component 38, but also an interference detection component 39.

The standard detection component 37 is configured to detect whether the communication standard of the communication component 2 is changed. The interference detection component 39 is configured to, in response to that the standard detection component 37 detects the communication standard of the communication component 2 being changed, further detect whether the communication operating frequency band (i.e., a communication operating frequency band after the communication standard is changed) in which the communication component 2 currently operates is interfered by a harmonic wave generated by an oscillator, establish a correspondence relationship between the communication standard according to which the communication component 2 currently operates and the oscillation operating frequency at which each oscillator currently operates and store the correspondence relationship into the second storage component 38 if it is detected that the communication operating frequency band in which the communication component 2 currently operates is not interfered by a harmonic wave generated by an oscillator, and control the acquisition component 31 to acquire the communication standard according to which the communication component 2 currently operates if it is detected that the changed communication operating frequency band of the communication component 2 is interfered by a harmonic wave generated by an oscillator. With such a design, the data stored in the second storage component 38 can be enriched continuously, so as to improve the control accuracy.

FIG. 6 is a block diagram illustrating a structure of a display driver component 1 according to an embodiment of the present disclosure. As shown in FIG. 6, in some embodiments, the display driver component 1 further includes a driving unit and a mobile industry processor interface (MIPI) unit (which is also referred to as MIPI interface unit), and the at least one oscillator includes a first oscillator and a second oscillator. The first oscillator is configured to provide a clock signal to the driving unit, and the second oscillator is configured to provide a clock signal to the MIPI interface unit.

Here, the driving unit generally includes a gate driving circuit (e.g., a gate driving circuit configured to output a Gate signal, a gate driving circuit configured to output an EM signal, and/or a gate driving circuit configured to output a reset signal Resst) and a source driving circuit.

Optionally, the oscillation operating frequency of the first oscillator is less than or equal to 151.7 Mhz, and the oscillation operating frequency of the second oscillator is greater than or equal to 151.7 Mhz. Further optionally, the oscillation operating frequency of the second oscillator ranges from 151.7 Mhz to 192 Mhz.

The oscillation operating frequency configured for the first oscillator and the oscillation operating frequency configured for the second oscillator may be equal to each other or different from each other.

Alternatively, the number of the first oscillators in an embodiment of the present disclosure may be 2 or more. For example, a separate first oscillator is configured for each gate driving circuit, and a separate first oscillator is also configured for the source driving circuit.

In some embodiments, the display driver component 1 further includes a register, and each oscillator is configured to operate according to a corresponding control instruction recorded in the register. The control component 33 includes a write unit, which is configured to write a corresponding control instruction into the register according to the oscillation operating frequency corresponding to each oscillator determined by the determination component 32, such that each oscillator operates at the corresponding oscillation operating frequency according to the control instruction recorded in the register.

Figures 7C, 7D, 8:
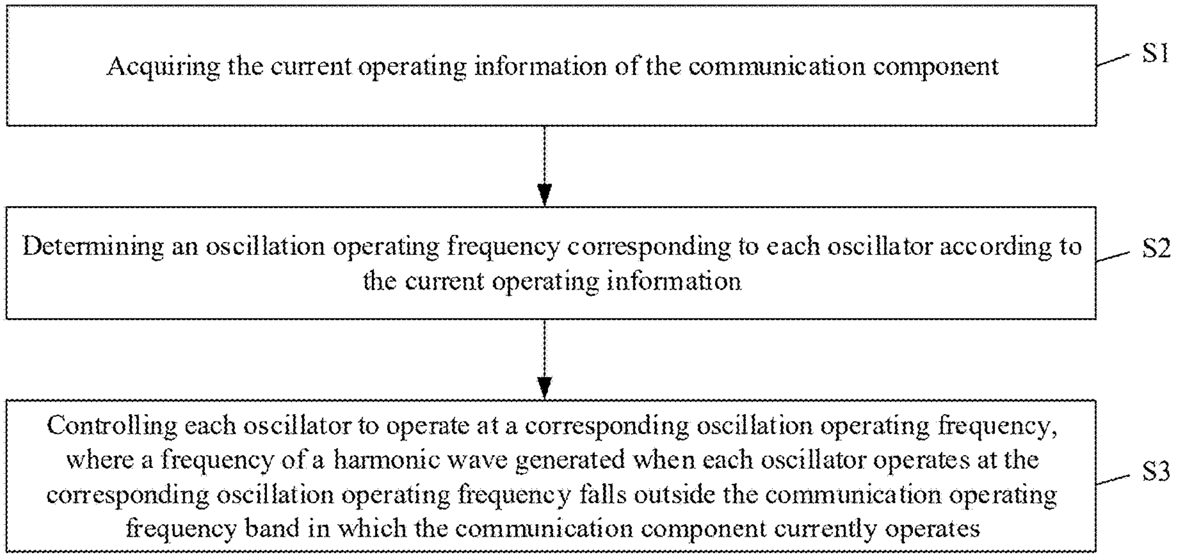
FIG. 7C is a schematic diagram illustrating codes of control instructions written by a write unit to a register for controlling a first oscillator to operate at 148 Mhz and a second oscillator to operate at 165.4 MHz.
FIG. 7D is a schematic diagram illustrating codes of control instructions written by a write unit to a register for controlling a first oscillator to operate at 148 Mhz and a second oscillator to operate at 170.5 MHz.
FIG. 8 is a flowchart of an oscillation frequency control method according to an embodiment of the present disclosure.

FIG. 7A is a schematic diagram illustrating codes of control instructions written by the write unit to the register for controlling the first oscillator to operate at 151.7 Mhz and the second oscillator to operate at 165.4 MHz. FIG. 7B is a schematic diagram illustrating codes of control instructions written by the write unit to the register for controlling the first oscillator to operate at 151.7 Mhz and the second oscillator to operate at 170.5 MHz. FIG. 7C is a schematic diagram illustrating codes of control instructions written by the write unit to the register for controlling the first oscillator to operate at 148 Mhz and the second oscillator to operate at 165.4 MHz. FIG. 7D is a schematic diagram illustrating codes of control instructions written by the write unit to the register for controlling the first oscillator to operate at 148 Mhz and the second oscillator to operate at 170.5 MHz. As shown in FIGS. 7A to 7D, the write unit may write a corresponding control instruction to the register within the display driver component via the MIPI interface, where OSC1 represents the oscillation operating frequency configured for the first oscillator, OSC2 represents the oscillation operating frequency configured for the second oscillator, OxF0 is an identifier of the first oscillator, and 0xC3 is an identifier of the second oscillator.

It should be noted that, FIG. 6 schematically illustrates a case where only two oscillators are disposed in the display driver component, and this case is only for exemplary purposes and does not limit the technical solutions of the present disclosure.

It is found in practical applications that, although the oscillation operating frequency of each oscillator may be set through the register in the display driver component, the actual oscillation operating frequency of each oscillator deviates (i.e., has a difference) from the set oscillation operating frequency, because each oscillator in the display driver component is generally an RC-type oscillator and is affected by a precision of a trimming process and an ambient temperature, such that a position where a harmonic wave appears when each oscillator operates is different from an expected position, and thus there is a risk that the communication operating frequency band in which the communication component currently operates is resonantly interfered by the harmonic wave.

Referring to FIGS. 3, 4 and 5 again, in order to effectively solve the above technical problem, in some embodiments, the oscillation frequency control system further includes a frequency calibration component 34, which is configured to perform frequency calibration on each oscillator so as to solve the problem that the actual oscillation operating frequency of each oscillator deviates from the set oscillation operating frequency.

In practical applications, frequency calibration may be performed on each oscillator in the following two ways. One of the two ways is, since an oscillator configured for an MIPI interface in an application processor (AP) is a quartz oscillator whose accuracy is high and is not affected by a stable change, a frequency of an MIPI clock in the application processor may be adopted to correct an OSC frequency of each oscillator in the display driver component. The other of the two ways is, the OSC frequency of each oscillator may be automatically corrected by continuously adjusting a PARAM parameter of the oscillator in the display driver component.

It should be noted that, in an embodiment of the present disclosure, the frequency calibration component 34 is integrated in the oscillation frequency control system, such that an integration level of a product can be effectively improved. Alternatively, in an embodiment of the present disclosure, the frequency calibration component 34 may be disposed independently of the oscillation frequency control system.

Based on the same inventive concept, an embodiment of the present disclosure further provides an oscillation frequency control method for a display device, and the oscillation frequency control method is based on the oscillation frequency control system provided by any one of the foregoing embodiments.

FIG. 8 is a flowchart of an oscillation frequency control method according to an embodiment of the present disclosure. As shown in FIG. 8, the display device includes the communication component and the display driver component including at least one oscillator, and the oscillation frequency control method includes the following steps S1 to S3.

Step S1 includes acquiring the current operating information of the communication component.

Step S2 includes determining an oscillation operating frequency corresponding to each oscillator according to the current operating information.

Step S3 includes controlling each oscillator to operate at a corresponding oscillation operating frequency, where a frequency of a harmonic wave generated when each oscillator operates at the corresponding oscillation operating frequency falls outside the communication operating frequency band in which the communication component currently operates.

Step S1 may be executed by the acquisition component in the foregoing embodiments, step S2 may be executed by the determination component in the foregoing embodiments, and step S3 may be executed by the control component in the foregoing embodiments. Detailed description of steps S1 to S3 may be referred to the contents of the foregoing embodiments, and will not be repeated here.

In an embodiment of the present disclosure, the oscillation operating frequency of each oscillator in the display driver component can be adjusted according to the current operating information of the communication component, such that a frequency of a harmonic wave generated when each oscillator operates is changed and falls outside the communication operating frequency band in which the communication component currently operates, thereby effectively avoiding the problem that the harmonic wave generated by each oscillator interferes with the communication component.

In addition, by the above manner of adjusting the oscillation operating frequency of each oscillator, a communication operating frequency range of the communication component is not limited any more, and the communication component can be applicable to various communication scenes.

Figure 9A:
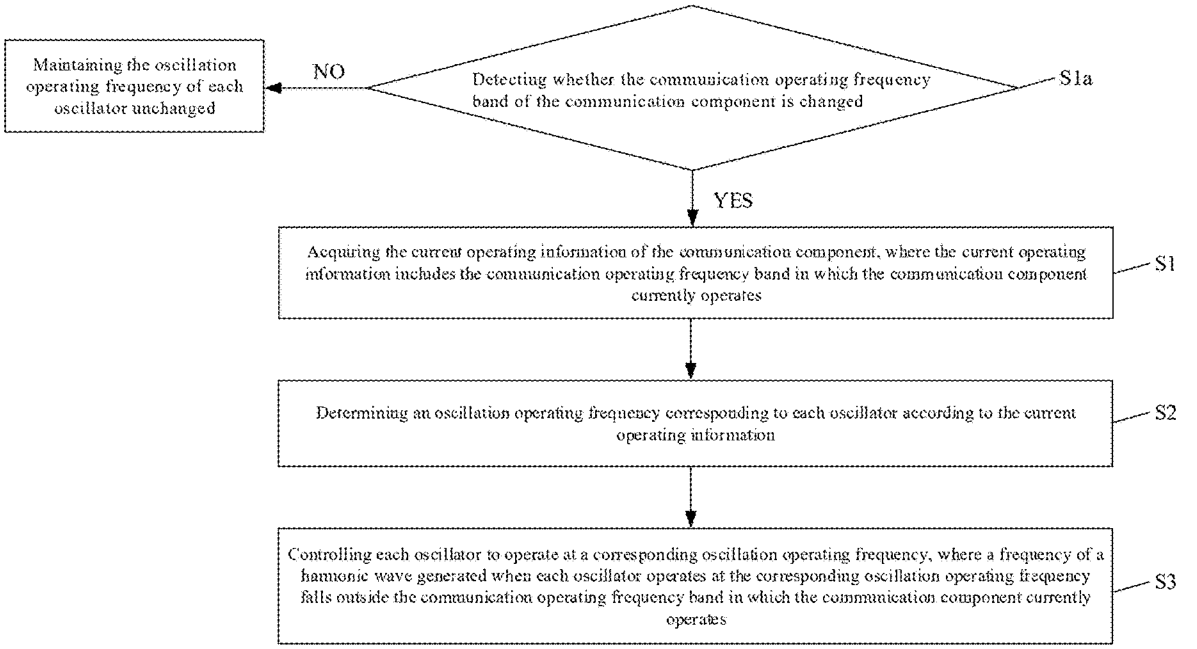
FIG. 9A is another flowchart of an oscillation frequency control method according to an embodiment of the present disclosure.

FIG. 9A is another flowchart of an oscillation frequency control method according to an embodiment of the present disclosure. As shown in FIG. 9A, in some embodiments, the current operating information includes the communication operating frequency band in which the communication component currently operates. Further optionally, the oscillation frequency control method shown in FIG. 9A not only includes steps S1 to S3 in the foregoing embodiments, but also includes step S1*a* prior to step S1.

Step S1*a* includes detecting whether the communication operating frequency band of the communication component is changed.

Step S1*a* may be executed by the frequency band detection component in the foregoing embodiments. If it is detected in step S1*a* that the communication operating frequency band of the communication component is changed, the step of acquiring the communication operating frequency band in which the communication component currently operates is executed (i.e., step S1 is executed); if it is detected in step S1*a* that the communication operating frequency band of the communication component is not changed, the oscillation operating frequency of each oscillator is maintained unchanged.

In some embodiments, step S2 further includes the following step S201*a*.

Step S201*a* includes determining a frequency adjustment scheme corresponding to the communication operating frequency band in which the communication component currently operates according to the first correspondence relationship data stored in advance.

The first correspondence relationship data records different communication operating frequency bands and their corresponding frequency adjustment schemes, and the frequency adjustment schemes record the oscillation operating frequencies corresponding to the oscillators.

Figure 9B:
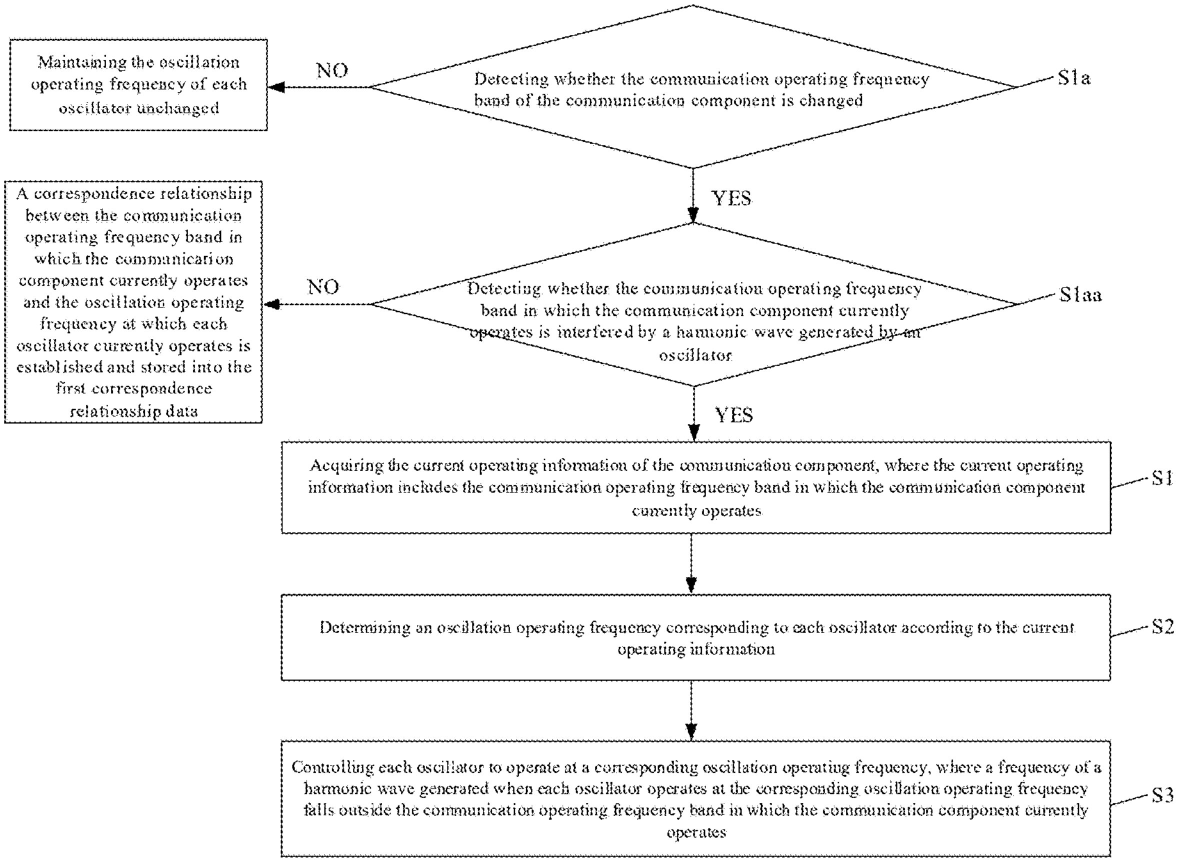
FIG. 9B is another flowchart of an oscillation frequency control method according to an embodiment of the present disclosure.

FIG. 9B is another flowchart of an oscillation frequency control method according to an embodiment of the present disclosure. As shown in FIG. 9B, the oscillation frequency control method shown in FIG. 9B not only includes steps S1*a* to S3 in the foregoing embodiments, but also includes step S1*aa* between steps S1*a* and S1.

Step S1*aa* is executed if it is detected in step S1*a* that the communication operating frequency band of the communication component is changed.

Step S1*aa* includes detecting whether the communication operating frequency band in which the communication component currently operates is interfered by a harmonic wave generated by an oscillator.

If it is detected that the communication operating frequency band in which the communication component currently operates is not interfered by a harmonic wave generated by an oscillator, a correspondence relationship between the communication operating frequency band in which the communication component currently operates and the oscillation operating frequency at which each oscillator currently operates is established and stored into the first correspondence relationship data.

If it is detected that the communication operating frequency band in which the communication component currently operates is interfered by a harmonic wave generated by an oscillator, the step of acquiring the communication operating frequency band in which the communication component currently operates is executed.

Figure 10A:
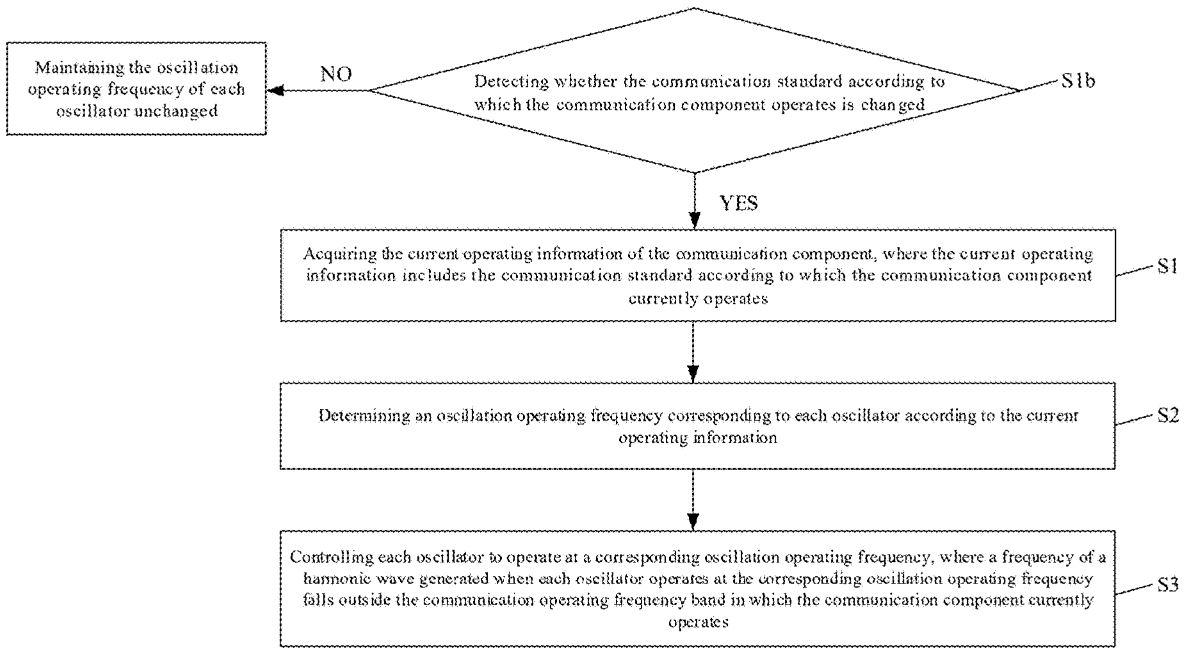
FIG. 10A is another flowchart of an oscillation frequency control method according to an embodiment of the present disclosure.

FIG. 10A is another flowchart of an oscillation frequency control method according to an embodiment of the present disclosure. As shown in FIG. 10A, in some embodiments, the current operating information includes the communication standard according to which the communication component currently operates. Further optionally, the oscillation frequency control method shown in FIG. 10A not only includes steps S1 to S3 in the foregoing embodiments, but also includes step S1*b* prior to step S1.

Step S1*b* includes detecting whether the communication standard according to which the communication component operates is changed.

Step S1*b* may be executed by the standard detection component in the foregoing embodiments. If it is detected in step S1*b* that the communication standard according to which the communication component operates is changed, a step of acquiring the communication standard according to which the communication component currently operates is executed (i.e., step S1 is executed); if it is detected in step S1*b* that the communication standard according to which the communication component operates is not changed, the oscillation operating frequency of each oscillator is maintained unchanged.

In some embodiments, the communication standards according to which the communication component operates include at least one of the 2G communication standard, the 3G communication standard, the WIFI communication standard, the 4G communication standard, or the 5G communication standard.

In some embodiments, step S2 further includes the following step S201*b*.

Step S201*b* includes determining a frequency adjustment scheme corresponding to the communication standard according to which the communication component currently operates according to the second correspondence relationship data stored in advance.

The second correspondence relationship data records different communication standards and their corresponding frequency adjustment schemes, and the frequency adjustment schemes record oscillation operating frequencies corresponding to the oscillators.

The display driver component further includes the register, and each oscillator is configured to operate according to a corresponding control instruction recorded in the register. Step S3 in the foregoing embodiments further includes the following step S301.

Step S301 includes writing a corresponding control instruction into the register according to the determined oscillation operating frequency corresponding to each oscillator, such that each oscillator operates at the corresponding oscillation operating frequency according to the control instruction recorded in the register.

Figure 10B:
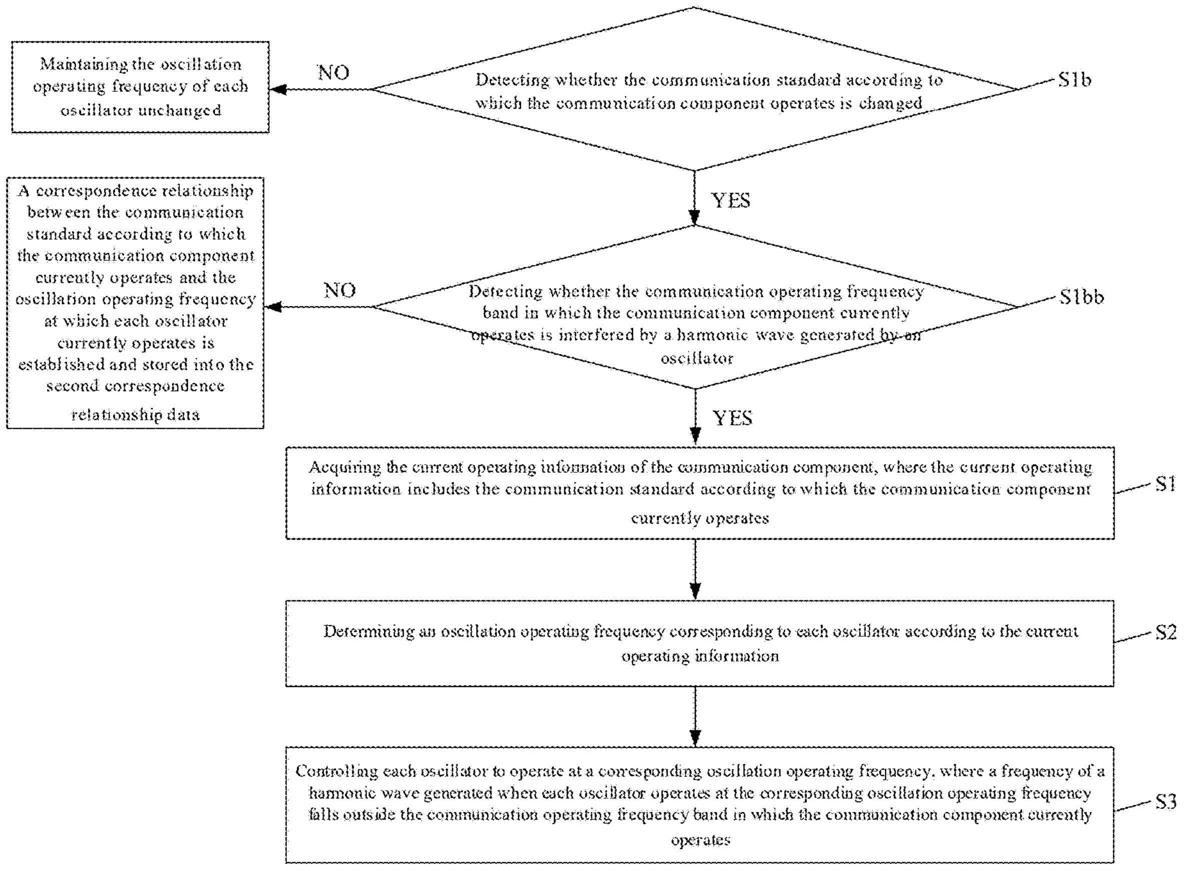
FIG. 10B is another flowchart of an oscillation frequency control method according to an embodiment of the present disclosure.

FIG. 10B is another flowchart of an oscillation frequency control method according to an embodiment of the present disclosure. As shown in FIG. 10B, the oscillation frequency control method shown in FIG. 10B not only includes steps S1*b* to S3 in the foregoing embodiments, but also includes step S1*bb* between steps S1*b* and S1.

Step S1*bb* is executed if it is detected in step S1*b* that the communication operating frequency band of the communication component is changed.

Step S1*bb* includes detecting whether the communication operating frequency band in which the communication component currently operates is interfered by a harmonic wave generated by an oscillator.

If it is detected that the communication operating frequency band in which the communication component currently operates is not interfered by a harmonic wave generated by an oscillator, a correspondence relationship between the communication standard according to which the communication component currently operates and the oscillation operating frequency at which each oscillator currently operates is established and stored into the second correspondence relationship data.

If it is detected that the communication operating frequency band in which the communication component currently operates is interfered by a harmonic wave generated by an oscillator, the step of acquiring the communication standard according to which the communication component currently operates is executed.

Figure 11:
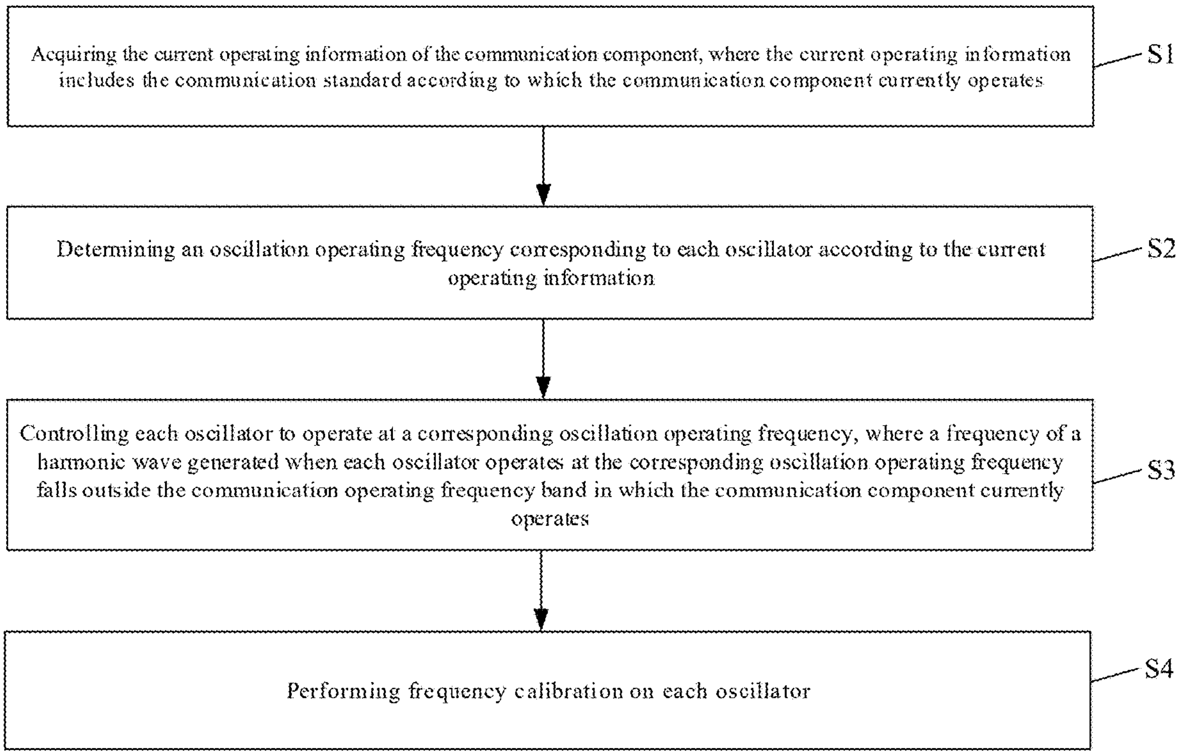
FIG. 11 is still another flowchart of an oscillation frequency control method according to an embodiment of the present disclosure.

FIG. 11 is still another flowchart of an oscillation frequency control method according to an embodiment of the present disclosure. As shown in FIG. 11, in some embodiments, the oscillation frequency control method includes not only steps S1 to S3, but also step S4.

Step S4 includes performing frequency calibration on an oscillator.

Step S4 may be executed by the frequency calibration component in the foregoing embodiments. Detailed description of step S4 may be referred to the corresponding contents in the foregoing embodiments, and is not repeated here.

In some embodiments, the display driver component further includes the driving unit and the MIPI interface unit;

- the at least one oscillator includes the first oscillator and the second oscillator; and
- the first oscillator is configured to provide a clock signal to the driving unit, and the second oscillator is configured to provide a clock signal to the MIPI interface unit.

Figure 12:
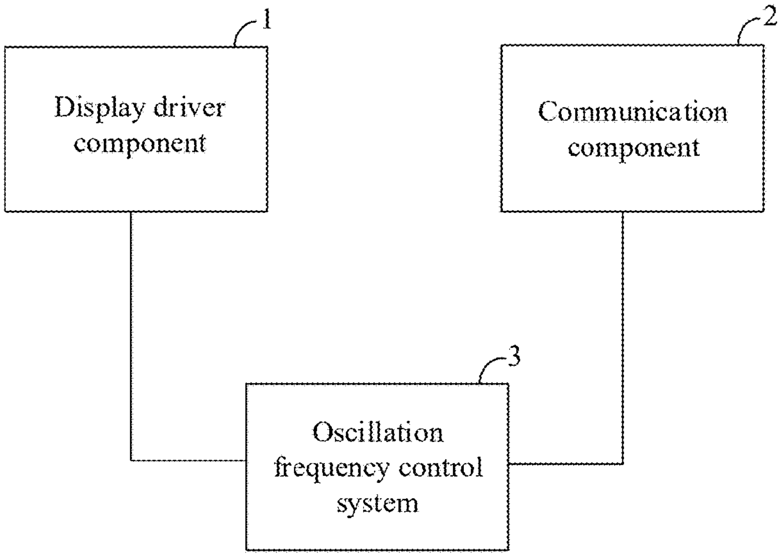
FIG. 12 is a block diagram illustrating a structure of a display device according to an embodiment of the present disclosure.

Based on the same inventive concept, an embodiment of the present disclosure also provides a display device. FIG. 12 is a block diagram illustrating a structure of a display device according to an embodiment of the present disclosure. As shown in FIG. 12, the display device includes a communication component, a display driver component, and an oscillation frequency control system, which is the oscillation frequency control system according to any one of the foregoing embodiments. Detailed description of the oscillation frequency control system may be referred to the contents in the foregoing embodiments, and is not repeated here.

The display device according to an embodiment of the present disclosure may be a display product having both a display function and a communication function, such as a mobile phone, a tablet computer, a notebook computer, a palm computer, a vehicle-mounted electronic device, a mobile internet device (MID), an augmented reality (AR)/virtual reality (VR) device, a robot, a wearable device, an ultra mobile personal computer (UMPC), a netbook, a personal digital assistant (PDA), a personal computer (PC), a television (TV), a teller machine, a self-service machine, and the like.

Based on the same inventive concept, an embodiment of the present disclosure further provides a computer-readable storage medium having computer executable instructions stored therein, and when being executed by a processor, the computer executable instructions cause the processor to implement the technical solution of the oscillation frequency control method according to any one of the foregoing embodiments. Implementation principles and advantageous effects of the computer-readable storage medium are similar to those of the oscillation frequency control method, and may be referred to the implementation principles and advantageous effects of the oscillation frequency control method, which are not repeated here.

It will be understood by one of ordinary skill in the art that all or some of the steps of the methods, systems, functional components of the systems as disclosed above may be implemented as software, firmware, hardware, or suitable combinations thereof. In a hardware implementation, the division between functional components referred to in the above description does not necessarily correspond to a division of physical components, and for example, one physical component may have multiple functions, or one function or step may be performed by several physical components in cooperation. Some or all of the physical components may be implemented as software executed by a processor, such as a central processing unit, a digital signal processor, or a microprocessor, or be implemented as hardware, or be implemented as an integrated circuit, such as an application specific integrated circuit. Such software may be distributed on a computer readable medium, which may include a computer storage medium (or non-transitory medium) and a communication medium (or transitory medium). The term of computer storage medium includes transitory and non-transitory, removable and non-removable media implemented in any method or technology for storage of information such as computer readable instructions, data structures, program blocks, or other data, as is well known to one of ordinary skill in the art. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used for storing the desired information and which can be accessed by a computer. In addition, communication media typically contains computer readable instructions, data structures, program blocks or other data in a modulated data signal such as a carrier wave or other transport mechanism, and may include any information delivery media as is well known to one of ordinary skill in the art.

Exemplary embodiments have been disclosed herein, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one of ordinary skill in the art. It will, therefore, be understood by one of ordinary skill in the art that various changes in form and details may be made therein without departing from the scope of the present disclosure as set forth in the appended claims.

What is claimed is:

1. An oscillation frequency control system for a display device, wherein the display device comprises a communication component and a display driver component, the display driver component comprises at least one oscillator; and the oscillation frequency control system comprises:

an acquisition component configured to acquire current operating information of the communication component;

a determination component configured to determine an oscillation operating frequency corresponding to each oscillator according to the current operating information; and a control component configured to control each oscillator to operate at a corresponding oscillation operating frequency, wherein a frequency of a harmonic wave generated when each oscillator operates at the corresponding oscillation operating frequency falls outside a communication operating frequency band in which the communication component currently operates;

wherein the display device further comprises a program, and a general purpose processor or an application processor, when being executed by the general purpose processor or the application processor, the program causes the general purpose processor or the application processor to serve as the acquisition component, the determination component, and the control component; and wherein the current operating information comprises the communication operating frequency band in which the communication component currently operates.

2. The oscillation frequency control system according claim 1, further comprising:

a frequency band detection component, which is configured to detect whether the communication operating frequency band of the communication component is changed, and control the acquisition component to acquire the communication operating frequency band in which the communication component currently operates in response to detecting that the communication operating frequency band of the communication component is changed;

wherein when being executed by the general purpose processor or the application processor, the program causes the general purpose processor or the application processor to further serve as the frequency band detection component.

3. The oscillation frequency control system according to claim 1, further comprising:

a first storage component configured to store first correspondence relationship data, wherein the first correspondence relationship data records different communication operating frequency bands and frequency adjustment schemes corresponding to the different communication operating frequency bands, and the frequency adjustment schemes record an oscillation operating frequency corresponding to each oscillator; and the determination component is further configured to determine a frequency adjustment scheme corresponding to the communication operating frequency band in which the communication component currently operates according to the first correspondence relationship data.

4. The oscillation frequency control system according to claim 1, further comprising:

a frequency band detection component, which is configured to detect whether the communication operating frequency band of the communication component is changed;

an interference detection component, which is configured to further detect, in response to the frequency band detection component detecting that the communication operating frequency band of the communication component is changed, whether the communication operating frequency band in which the communication component currently operates is interfered by a harmonic wave generated by any one of the at least one oscillator, establish a correspondence relationship between the communication operating frequency band in which the communication component currently operates and the oscillation operating frequency in which each oscillator currently operates and store the correspondence relationship into the first storage component in response to detecting that the communication operating frequency band in which the communication component currently operates is not interfered by a harmonic wave generated by any one of the at least one oscillator, and control the acquisition component to acquire the communication operating frequency band in which the communication component currently operates in response to detecting that the communication operating frequency band in which the communication component currently operates is interfered by a harmonic wave generated by any one of the at least one oscillator;

a first storage component configured to store first correspondence relationship data, wherein the first correspondence relationship data records different communication operating frequency bands and frequency adjustment schemes corresponding to the different communication operating frequency bands, and the frequency adjustment schemes record an oscillation operating frequency corresponding to each oscillator; and the determination component is further configured to determine a frequency adjustment scheme corresponding to the communication operating frequency band in which the communication component currently operates according to the first correspondence relationship data;

wherein when being executed by the general purpose processor or the application processor, the program causes the general purpose processor or the application processor to further serve as the frequency band detection component and the interference detection component.

5. The oscillation frequency control system according to claim 1, wherein the display driver component further comprises a register, and each oscillator is configured to operate according to a corresponding control instruction recorded in the register;

the control component comprises:

a write unit configured to write the corresponding control instruction into the register according to the oscillation operating frequency corresponding to each oscillator determined by the determination component, such that each oscillator operates at the corresponding oscillation operating frequency according to control instructions recorded in the register;

wherein when being executed by the general purpose processor or the application processor, the program causes the general purpose processor or the application processor to further serve as the write unit.

6. The oscillation frequency control system according to claim 1, further comprising:

a frequency calibration component configured to perform frequency calibration on the at least one oscillator;

wherein when being executed by the general purpose processor or the application processor, the program causes the general purpose processor or the application processor to further serve as the frequency calibration component.

7. The oscillation frequency control system according to claim 1, wherein the display driver component further comprises a driving unit and an MIPI interface unit;

the at least one oscillator comprises a first oscillator and a second oscillator; and the first oscillator is configured to provide a clock signal to the driving unit, and the second oscillator is configured to provide a clock signal to the MIPI interface unit.

8. The display device, comprising: the communication component, the display driver component, and the oscillation frequency control system according to claim 1.

9. An oscillation frequency control system for a display device, wherein the display device comprises a communication component and a display driver component, the display driver component comprises at least one oscillator; and the oscillation frequency control system comprises:

an acquisition component configured to acquire current operating information of the communication component;

a determination component configured to determine an oscillation operating frequency corresponding to each oscillator according to the current operating information; and a control component configured to control each oscillator to operate at a corresponding oscillation operating frequency, wherein a frequency of a harmonic wave generated when each oscillator operates at the corresponding oscillation operating frequency falls outside a communication operating frequency band in which the communication component currently operates;

wherein the display device further comprises a program, and a general purpose processor or an application processor, when being executed by the general purpose processor or the application processor, the program causes the general purpose processor or the application processor to serve as the acquisition component, the determination component, and the control component; and wherein the current operating information comprises a communication standard according to which the communication component currently operates.

10. The oscillation frequency control system according to claim 9, wherein the communication standard supported by the communication component comprises at least one of a 2G communication standard, a 3G communication standard, a WIFI communication standard, a 4G communication standard, or a 5G communication standard.

11. The oscillation frequency control system according to claim 9, further comprising:

a standard detection component, which is configured to detect whether the communication standard of the communication component is changed, and control the acquisition component to acquire the communication standard according to which the communication component currently operates in response to detecting that the communication standard of the communication component is changed;

wherein when being executed by the general purpose processor or the application processor, the program causes the general purpose processor or the application processor to further serve as the standard detection component.

12. The oscillation frequency control system according to claim 9, further comprising:

a second storage component configured to store second correspondence relationship data, wherein the second correspondence relationship data records different communication standards and frequency adjustment schemes corresponding to the different communication standards, and the frequency adjustment schemes record an oscillation operating frequency corresponding to each oscillator; and the determination component is further configured to determine a frequency adjustment scheme corresponding to the communication standard according to which the communication component currently operates according to the second correspondence relationship data.

13. The oscillation frequency control system according to claim 9, further comprising:

a standard detection component, which is configured to detect whether the communication standard of the communication component is changed;

an interference detection component, which is configured to further detect, in response to the standard detection component detecting that the communication standard of the communication component is changed, whether the communication operating frequency band in which the communication component currently operates is interfered by a harmonic wave generated by any one of the at least one oscillator, establish a correspondence relationship between the communication standard according to which the communication component currently operates and the oscillation operating frequency in which each oscillator currently operates and store the correspondence relationship into a second storage component in response to detecting that the communication operating frequency band in which the communication component currently operates is not interfered by a harmonic wave generated by any one of the at least one oscillator, and control the acquisition component to acquire the communication standard according to which the communication component currently operates in response to detecting that the communication operating frequency band in which the communication component currently operates is interfered by a harmonic wave generated by any one of the at least one oscillator;

the second storage component configured to store second correspondence relationship data, wherein the second correspondence relationship data records different communication standards and frequency adjustment schemes corresponding to the different communication standards, and the frequency adjustment schemes record an oscillation operating frequency corresponding to each oscillator; and the determination component is further configured to determine a frequency adjustment scheme corresponding to the communication standard according to which the communication component currently operates according to the second correspondence relationship data;

wherein when being executed by the general purpose processor or the application processor, the program causes the general purpose processor or the application processor to further serve as the standard detection component and the interference detection component.

14. The display device, comprising: the communication component, the display driver component, and the oscillation frequency control system according to claim 9.

15. An oscillation frequency control method for a display device, wherein the display device comprises a communication component and a display driver component, the display driver component comprises at least one oscillator; and the oscillation frequency control method comprises:

acquiring current operating information of the communication component;

determining an oscillation operating frequency corresponding to each oscillator according to the current operating information; and controlling each oscillator to operate at a corresponding oscillation operating frequency, wherein a frequency of a harmonic wave generated when each oscillator operates at the corresponding oscillation operating frequency falls outside a communication operating frequency band in which the communication component currently operates;

wherein the current operating information comprises the communication operating frequency band in which the communication component currently operates or a communication standard according to which the communication component currently operates.

16. The oscillation frequency control method according to claim 15, wherein prior to the acquiring current operating information of the communication component, the oscillation frequency control method further comprises:

detecting whether the communication operating frequency band of the communication component is changed; and performing control to acquire the communication operating frequency band in which the communication component currently operates in response to detecting that the communication operating frequency band of the communication component is changed;

or wherein the determining an oscillation operating frequency corresponding to each oscillator according to the current operating information comprises: determining a frequency adjustment scheme corresponding to the communication operating frequency band in which the communication component currently operates according to first correspondence relationship data stored in advance; wherein the first correspondence relationship data records different communication operating frequency bands and frequency adjustment schemes corresponding to the different communication operating frequency bands, and the frequency adjustment schemes record an oscillation operating frequency corresponding to each oscillator;

or wherein prior to the acquiring current operating information of the communication component, the oscillation frequency control method further comprises: detecting whether the communication operating frequency band of the communication component is changed; further detecting, in response to detecting that the communication operating frequency band of the communication component is changed, whether the communication operating frequency band in which the communication component currently operates is interfered by a harmonic wave generated by any one of the at least one oscillator; establishing a correspondence relationship between the communication operating frequency band in which the communication component currently operates and the oscillation operating frequency in which each oscillator currently operates and store the correspondence relationship into first correspondence relationship data in response to detecting that the communication operating frequency band in which the communication component currently operates is not interfered by a harmonic wave generated by any one of the at least one oscillator; and acquiring the communication operating frequency band in which the communication component currently operates in response to detecting that the communication operating frequency band in which the communication component currently operates is interfered by a harmonic wave generated by any one of the at least one oscillator; the determining an oscillation operating frequency corresponding to each oscillator according to the current operating information comprises: determining a frequency adjustment scheme corresponding to the communication operating frequency band in which the communication component currently operates according to the first correspondence relationship data stored in advance, wherein the first correspondence relationship data records different communication operating frequency bands and frequency adjustment schemes corresponding to the different communication operating frequency bands, and the frequency adjustment schemes record an oscillation operating frequency corresponding to each oscillator.

17. The oscillation frequency control method according to claim 15, wherein the communication standard supported by the communication component comprises at least one of a 2G communication standard, a 3G communication standard, a WIFI communication standard, a 4G communication standard, or a 5G communication standard;

or wherein prior to the acquiring current operating information of the communication component, the oscillation frequency control method further comprises: detect whether the communication standard of the communication component is changed; and acquiring the communication standard according to which the communication component currently operates in response to detecting that the communication standard of the communication component is changed;

or wherein the determining an oscillation operating frequency corresponding to each oscillator according to the current operating information comprises: determining a frequency adjustment scheme corresponding to the communication standard according to which the communication component currently operates according to second correspondence relationship data stored in advance, wherein the second correspondence relationship data records different communication standards and frequency adjustment schemes corresponding to the different communication standards, and the frequency adjustment schemes record an oscillation operating frequency corresponding to each oscillator;

or wherein prior to the acquiring current operating information of the communication component, the oscillation frequency control method further comprises: detecting whether the communication standard of the communication component is changed; further detecting, in response to detecting that the communication standard of the communication component is changed, whether the communication operating frequency band in which the communication component currently operates is interfered by a harmonic wave generated by any one of the at least one oscillator; establishing a correspondence relationship between the communication standard according to which the communication component currently operates and the oscillation operating frequency in which each oscillator currently operates and store the correspondence relationship into second correspondence relationship data in response to detecting that the communication operating frequency band in which the communication component currently operates is not interfered by a harmonic wave generated by any one of the at least one oscillator; and acquiring the communication standard according to which the communication component currently operates in response to detecting that the communication operating frequency band in which the communication component currently operates is interfered by a harmonic wave generated by any one of the at least one oscillator; the determining an oscillation operating frequency corresponding to each oscillator according to the current operating information comprises: determining a frequency adjustment scheme corresponding to the communication standard according to which the communication component currently operates according to the second correspondence relationship data stored in advance, wherein the second correspondence relationship data records different communication standards and frequency adjustment schemes corresponding to the different communication standards, and the frequency adjustment schemes record an oscillation operating frequency corresponding to each oscillator.

18. The oscillation frequency control method according to claim 15, wherein the display driver component further comprises a register, and each oscillator is configured to operate according to a corresponding control instruction recorded in the register;

the controlling each oscillator to operate at a corresponding oscillation operating frequency comprises:

writing the corresponding control instruction into the register according to the determined oscillation operating frequency corresponding to each oscillator, such that each oscillator operates at the corresponding oscillation operating frequency according to control instructions recorded in the register;

or wherein the oscillation frequency control method further comprises: performing frequency calibration on the at least one oscillator;

or wherein the display driver component further comprises a driving unit and an MIPI interface unit; the at least one oscillator comprises a first oscillator and a second oscillator; and the first oscillator is configured to provide a clock signal to the driving unit, and the second oscillator is configured to provide a clock signal to the MIPI interface unit.

* * * * *